US011661646B2

(12) United States Patent
Huang et al.

(10) Patent No.: US 11,661,646 B2
(45) Date of Patent: May 30, 2023

(54) DUAL PHASE MAGNETIC MATERIAL COMPONENT AND METHOD OF ITS FORMATION

(71) Applicant: General Electric Company, Schenectady, NY (US)

(72) Inventors: Shenyan Huang, Niskayuna, NY (US); Steve John Buresh, Latham, NY (US); Min Zou, Niskayuna, NY (US); Wanming Zhang, Clifton Park, NY (US); Pazhayannur Ramanathan Subramanian, Clifton Park, NY (US); Deborah D. Whitis, West Chester, OH (US)

(73) Assignee: General Electric Comapny, Schenectady, NY (US)

( * ) Notice: Subject to any disclaimer, the term of this patent is extended or adjusted under 35 U.S.C. 154(b) by 22 days.

(21) Appl. No.: 17/236,184

(22) Filed: Apr. 21, 2021

(65) Prior Publication Data

US 2022/0341020 A1 Oct. 27, 2022

(51) Int. Cl.
*C23C 8/04* (2006.01)
*C23C 8/24* (2006.01)

(52) U.S. Cl.
CPC . *C23C 8/04* (2013.01); *C23C 8/24* (2013.01)

(58) Field of Classification Search
CPC .................................. C23C 8/04; C23C 8/24
See application file for complete search history.

(56) References Cited

U.S. PATENT DOCUMENTS

| 905,817 | A | 12/1908 | Howell |
| 1,031,316 | A | 7/1912 | Apple |
| 1,042,408 | A | 10/1912 | Dearborn |
| 1,279,643 | A | 9/1918 | Brown |
| 1,581,876 | A | 4/1926 | Samson |
| 2,015,554 | A | 9/1935 | Fisher |
| 2,452,530 | A | 9/1945 | Snoek |
| 2,451,633 | A | 10/1948 | Perrigo |
| 3,257,572 | A | 6/1966 | Ludemann et al. |
| 3,334,252 | A | 8/1967 | Gayral |
| 3,797,106 | A | 3/1974 | Costello |
| 3,869,629 | A | 3/1975 | Ogawa et al. |
| 3,954,648 | A | 5/1976 | Belcak et al. |

(Continued)

FOREIGN PATENT DOCUMENTS

| CN | 101467330 A | 6/2009 |
| CN | 101645628 A | 2/2010 |

(Continued)

OTHER PUBLICATIONS

Calfo et al., High-Speed Generators for Power-Dense, Medium-Power, Gas Turbine Generator Sets, Naval Engineers Journal, vol. 119, Issue 2, Published on-line Nov. 14, 2007, pp. 63-81.

(Continued)

*Primary Examiner* — Jessee R Roe
(74) *Attorney, Agent, or Firm* — Dority & Manning, P.A.

(57) ABSTRACT

A dual phase magnetic component, along with methods of its formation, is provided. The dual phase magnetic component may include an intermixed first region and second region formed from a single material, with the first region having a magnetic area and a diffused metal therein, and with the second region having a non-magnetic area. The second region generally has greater than 0.1 weight % of nitrogen.

11 Claims, 3 Drawing Sheets

(56) References Cited

U.S. PATENT DOCUMENTS

| | | |
|---|---|---|
| 3,979,821 A | 9/1976 | Noodleman |
| 4,121,953 A | 10/1978 | Hull |
| 4,354,126 A | 10/1982 | Yates |
| 4,445,062 A | 4/1984 | Glaser |
| 4,572,792 A | 2/1986 | Muller |
| 4,588,914 A | 5/1986 | Heyne |
| 4,663,536 A | 5/1987 | Roesel, Jr. et al. |
| 4,713,122 A | 12/1987 | Dawes et al. |
| 4,721,549 A | 1/1988 | Bogenschuetz et al. |
| 4,724,348 A | 2/1988 | Stokes |
| 4,746,376 A | 5/1988 | Bessey |
| 4,790,888 A | 12/1988 | Bessey |
| 4,912,353 A | 3/1990 | Kondo et al. |
| 4,916,027 A | 4/1990 | Delmundo |
| 4,918,831 A | 4/1990 | Kliman |
| 5,010,267 A | 4/1991 | Lipo et al. |
| 5,029,265 A | 7/1991 | Staats |
| 5,124,607 A | 6/1992 | Rieber et al. |
| 5,155,404 A | 10/1992 | Sadarangani |
| 5,214,839 A | 6/1993 | Rieber et al. |
| 5,221,139 A | 6/1993 | Belfer |
| 5,238,507 A | 8/1993 | Kugimiya et al. |
| 5,250,867 A | 10/1993 | Gizaw |
| 5,266,859 A | 11/1993 | Stanley |
| 5,296,773 A | 3/1994 | El-Antably et al. |
| 5,376,188 A | 12/1994 | Tahara et al. |
| 5,547,770 A | 8/1996 | Meelu et al. |
| 5,580,800 A | 12/1996 | Zhang et al. |
| 5,643,474 A | 7/1997 | Sangeeta |
| 5,672,925 A | 9/1997 | Lipo et al. |
| 5,684,352 A | 11/1997 | Mita et al. |
| 5,698,917 A | 12/1997 | Shultz |
| 5,731,666 A | 3/1998 | Folker et al. |
| 5,818,140 A | 10/1998 | Vagati |
| 5,841,212 A | 11/1998 | Mita et al. |
| 5,900,126 A | 5/1999 | Nelson et al. |
| 6,058,596 A | 5/2000 | Jansen et al. |
| 6,064,132 A | 5/2000 | Nose |
| 6,080,245 A | 6/2000 | Uchida et al. |
| 6,093,984 A | 7/2000 | Shiga et al. |
| 6,132,520 A | 10/2000 | Schilbe et al. |
| 6,146,692 A | 11/2000 | Sangeeta et al. |
| 6,187,664 B1 | 2/2001 | Yu |
| 6,191,511 B1 | 2/2001 | Zysset |
| 6,232,692 B1 | 5/2001 | Kliman |
| 6,245,441 B1 | 6/2001 | Yokoyama et al. |
| 6,255,005 B1 | 7/2001 | Yokoyama et al. |
| 6,261,361 B1 | 7/2001 | Iida et al. |
| 6,274,960 B1 | 8/2001 | Sakai et al. |
| 6,284,388 B1 | 9/2001 | Blotzer et al. |
| 6,288,467 B1 | 9/2001 | Lange et al. |
| 6,300,703 B1 | 10/2001 | Kawano et al. |
| 6,313,560 B1 | 11/2001 | Dooley |
| 6,345,544 B1 | 2/2002 | Mizuno et al. |
| 6,354,310 B1 | 3/2002 | Farr et al. |
| 6,468,365 B1 | 10/2002 | Uchida et al. |
| 6,487,769 B2 | 12/2002 | Ketterer et al. |
| 6,515,395 B1 | 2/2003 | Jansen |
| 6,531,049 B1 | 3/2003 | Kariya et al. |
| 6,534,891 B2 | 3/2003 | Kliman et al. |
| 6,574,079 B2 | 6/2003 | Sun et al. |
| 6,603,226 B1 | 8/2003 | Liang et al. |
| 6,611,076 B2 | 8/2003 | Lindbery et al. |
| 6,664,696 B1 | 12/2003 | Pham et al. |
| 6,675,460 B2 | 1/2004 | Reiter, Jr. et al. |
| 6,758,914 B2 | 7/2004 | Kool et al. |
| 6,769,167 B2 | 8/2004 | Lee et al. |
| 6,772,503 B2 | 8/2004 | Fathimulla et al. |
| 6,781,184 B2 | 8/2004 | Solayappan et al. |
| 6,784,588 B2 | 8/2004 | DeCristofaro et al. |
| 6,809,442 B2 | 10/2004 | Kaneko et al. |
| 6,815,861 B2 | 11/2004 | Suzuki et al. |
| 6,822,417 B2 | 11/2004 | Kawaji et al. |
| 6,849,983 B2 | 2/2005 | Tajima et al. |
| 6,874,221 B2 | 4/2005 | Jansen et al. |
| 6,878,215 B1 | 4/2005 | Zimmerman, Jr. |
| 6,888,270 B2 | 5/2005 | Reiter, Jr. et al. |
| 6,911,756 B1 | 6/2005 | Chang |
| 6,916,429 B2 | 7/2005 | Kool et al. |
| 6,967,420 B2 | 11/2005 | Laurent et al. |
| 6,998,757 B2 | 2/2006 | Seguchi et al. |
| 7,154,191 B2 | 12/2006 | Jansen et al. |
| 7,204,012 B2 | 4/2007 | Kloepzig et al. |
| 7,205,695 B2 | 4/2007 | Smith |
| 7,268,450 B2 | 9/2007 | Takeuchi |
| 7,279,116 B2 | 10/2007 | Sax |
| 7,321,176 B2 | 1/2008 | Strothmann |
| 7,348,706 B2 | 3/2008 | Ionel et al. |
| 7,377,986 B2 | 5/2008 | Schoen et al. |
| 7,471,025 B2 | 12/2008 | Sheeran et al. |
| 7,504,755 B2 | 3/2009 | Yabe et al. |
| 7,514,833 B2 | 4/2009 | Hsu et al. |
| 7,556,082 B2 | 7/2009 | Welchko et al. |
| 7,605,503 B2 | 10/2009 | El-Rafai et al. |
| 7,652,404 B2 | 1/2010 | El-Refaie et al. |
| 7,687,334 B2 | 3/2010 | Zou et al. |
| 7,696,662 B2 | 4/2010 | Komuro et al. |
| 7,709,057 B2 | 5/2010 | Fusaro et al. |
| 7,727,892 B2 | 6/2010 | Morrow et al. |
| 7,791,237 B2 | 9/2010 | Shah et al. |
| 7,846,271 B2 | 12/2010 | Choi et al. |
| 7,927,937 B2 | 4/2011 | Zou et al. |
| 8,004,140 B2 | 8/2011 | Alexander et al. |
| 8,018,110 B2 | 9/2011 | Alexander et al. |
| 8,069,555 B2 | 12/2011 | Tang et al. |
| 8,076,811 B2 | 12/2011 | Zhu et al. |
| 8,154,167 B2 | 1/2012 | Tang |
| 8,159,103 B2 | 4/2012 | Rodriguez et al. |
| 8,179,009 B2 | 5/2012 | Saban |
| 8,319,388 B2 | 11/2012 | Yoshino et al. |
| 8,344,581 B2 | 1/2013 | Yabe et al. |
| 8,410,656 B2 | 4/2013 | Lokhandwalla et al. |
| 8,567,040 B2 | 10/2013 | Kubo |
| 8,659,199 B2 | 2/2014 | Tokoi et al. |
| 8,729,766 B2 | 5/2014 | Reutlinger et al. |
| 8,836,196 B2 | 9/2014 | Calley et al. |
| 9,000,642 B2 | 4/2015 | Moulin et al. |
| 9,212,555 B2 | 12/2015 | Manier et al. |
| 9,214,846 B2 | 12/2015 | Fubuki |
| 9,384,987 B2 | 7/2016 | Jung et al. |
| 9,634,549 B2 | 4/2017 | Dial et al. |
| 9,803,139 B1 | 10/2017 | Bonitatibus, Jr. et al. |
| 9,879,356 B2 | 1/2018 | Wittel et al. |
| 10,020,098 B2 | 7/2018 | Fumsawa et al. |
| 10,190,206 B2 | 1/2019 | Dial et al. |
| 10,229,776 B2 | 3/2019 | Johnson et al. |
| 10,229,777 B2 | 3/2019 | Zou et al. |
| 10,276,667 B1 | 4/2019 | Atanackovic |
| 10,396,615 B2 | 8/2019 | Galioto et al. |
| 10,483,037 B2 | 11/2019 | Lambourne et al. |
| 10,501,839 B2 | 12/2019 | Kool |
| 10,673,288 B2 | 6/2020 | Kool et al. |
| 10,748,678 B2 | 8/2020 | Kurokawa et al. |
| 10,749,385 B2 | 8/2020 | Reddy et al. |
| 2002/0054462 A1 | 5/2002 | Sun et al. |
| 2002/0100493 A1 | 8/2002 | Kool et al. |
| 2003/0003765 A1 | 1/2003 | Gibson et al. |
| 2003/0062786 A1 | 4/2003 | Reiter, Jr. et al. |
| 2003/0062791 A1 | 4/2003 | Reiter, Jr. et al. |
| 2003/0201687 A1 | 10/2003 | Asai |
| 2004/0021396 A1 | 2/2004 | Ehrhart et al. |
| 2004/0074873 A1 | 4/2004 | Kool et al. |
| 2004/0090135 A1 | 5/2004 | Maslov et al. |
| 2004/0189108 A1 | 9/2004 | Dooley |
| 2004/0201358 A1 | 10/2004 | Kawaji et al. |
| 2004/0245869 A1 | 12/2004 | Dooley |
| 2005/0041432 A1 | 2/2005 | McCarthy et al. |
| 2005/0161438 A1 | 7/2005 | Kool et al. |
| 2005/0281023 A1 | 12/2005 | Gould et al. |
| 2007/0017601 A1 | 1/2007 | Miyata et al. |
| 2007/0086131 A1 | 4/2007 | Miller et al. |
| 2007/0203041 A1 | 8/2007 | Lee |
| 2007/0252465 A1 | 11/2007 | Sasaki et al. |
| 2007/0252471 A1 | 11/2007 | Holmes et al. |

(56) References Cited

U.S. PATENT DOCUMENTS

| | | |
|---|---|---|
| 2008/0018189 A1 | 1/2008 | Dooley |
| 2008/0143207 A1 | 6/2008 | Shah |
| 2008/0191578 A1 | 8/2008 | Evans |
| 2008/0238217 A1 | 10/2008 | Shah et al. |
| 2008/0238236 A1 | 10/2008 | El-Refaie |
| 2009/0002978 A1 | 1/2009 | Tran et al. |
| 2009/0021105 A1 | 1/2009 | Evans |
| 2009/0072647 A1 | 3/2009 | Hino et al. |
| 2009/0115361 A1 | 5/2009 | Nitta |
| 2009/0302004 A1 | 12/2009 | Manier et al. |
| 2010/0090557 A1 | 4/2010 | El-Rafaie et al. |
| 2010/0120230 A1 | 5/2010 | Grivna et al. |
| 2010/0126878 A1 | 5/2010 | Marjanovic et al. |
| 2010/0141076 A1 | 6/2010 | Blissenbach et al. |
| 2010/0253174 A1 | 10/2010 | Yabe et al. |
| 2010/0277017 A1 | 11/2010 | Alexander et al. |
| 2010/0277028 A1 | 11/2010 | Alexander et al. |
| 2011/0037338 A1 | 2/2011 | Leiber et al. |
| 2011/0088720 A1 | 4/2011 | Varanasi et al. |
| 2011/0175225 A1 | 7/2011 | Seddon et al. |
| 2011/0186191 A1 | 8/2011 | Murakami et al. |
| 2011/0266893 A1 | 11/2011 | El-Refaie |
| 2012/0021917 A1 | 1/2012 | Sakamoto et al. |
| 2012/0040840 A1 | 2/2012 | Okayama et al. |
| 2012/0126652 A1 | 5/2012 | Shah et al. |
| 2012/0129049 A1 | 5/2012 | Rayner |
| 2012/0288396 A1 | 11/2012 | Lee et al. |
| 2012/0315180 A1 | 12/2012 | Soderman et al. |
| 2012/0328467 A1 | 12/2012 | Fernandez Acevedo et al. |
| 2013/0002064 A1 | 1/2013 | De Bock et al. |
| 2013/0022833 A1 | 1/2013 | Wakade |
| 2013/0043760 A1 | 2/2013 | Osborne et al. |
| 2013/0106500 A1 | 5/2013 | Yin et al. |
| 2013/0119810 A1 | 5/2013 | Aoyama |
| 2013/0140932 A1 | 6/2013 | Reddy et al. |
| 2013/0204018 A1 | 8/2013 | Parvulescu et al. |
| 2013/0214620 A1 | 8/2013 | Kobayashi et al. |
| 2014/0001906 A1 | 1/2014 | Li et al. |
| 2014/0028145 A1 | 1/2014 | Luise et al. |
| 2014/0062247 A1 | 3/2014 | Dorfner et al. |
| 2014/0239763 A1 | 8/2014 | Raminosoa et al. |
| 2014/0246944 A1 | 9/2014 | Koka et al. |
| 2014/0265708 A1 | 9/2014 | Galito et al. |
| 2015/0031084 A1 | 1/2015 | Banta et al. |
| 2015/0054380 A1 | 2/2015 | Suzuki |
| 2015/0109080 A1 | 4/2015 | Fullerton |
| 2015/0115749 A1 | 4/2015 | Dial et al. |
| 2015/0115757 A1 | 4/2015 | Reddy et al. |
| 2015/0171682 A1 | 6/2015 | Fujisawa et al. |
| 2015/0179917 A1 | 6/2015 | Greer et al. |
| 2015/0295454 A1 | 10/2015 | El-Refaie et al. |
| 2015/0361545 A1 | 12/2015 | Walker |
| 2016/0087503 A1 | 3/2016 | Galioto et al. |
| 2016/0102012 A1 | 4/2016 | Pilon et al. |
| 2016/0121421 A1 | 5/2016 | Uhm et al. |
| 2016/0203898 A1 | 7/2016 | Johnson et al. |
| 2016/0203899 A1 | 7/2016 | Zou et al. |
| 2016/0294236 A1 | 10/2016 | Alexander et al. |
| 2016/0359100 A1 | 12/2016 | Bhushan et al. |
| 2017/0183764 A1 | 6/2017 | Dial et al. |
| 2018/0183279 A1 | 6/2018 | Kool et al. |
| 2018/0337565 A1 | 11/2018 | Reddy et al. |
| 2019/0279795 A1 | 9/2019 | Zhang et al. |

FOREIGN PATENT DOCUMENTS

| | | |
|---|---|---|
| CN | 101728911 A | 9/2010 |
| CN | 202395537 U | 8/2012 |
| CN | 106346146 B | 1/2018 |
| DE | 102005025944 A1 | 12/2006 |
| DE | 102005046165 A1 | 4/2007 |
| DE | 102009044196 A1 | 4/2010 |
| EP | 0880216 A1 | 11/1998 |
| EP | 0959549 A1 | 11/1999 |
| EP | 1251624 A2 | 10/2002 |
| EP | 1431421 A1 | 6/2004 |
| EP | 1450462 A1 | 8/2004 |
| EP | 1777795 A2 | 4/2007 |
| EP | 2237390 A2 | 10/2010 |
| EP | 3231889 A1 | 10/2017 |
| JP | S57189542 A | 11/1982 |
| JP | S60219945 A | 11/1985 |
| JP | H06113493 A | 4/1994 |
| JP | H0636664 B2 | 5/1994 |
| JP | H11146586 A | 5/1999 |
| JP | H11168864 A | 6/1999 |
| JP | H11206082 A | 7/1999 |
| JP | 2000060036 A | 2/2000 |
| JP | 2000069699 A | 3/2000 |
| JP | 2000184643 A | 6/2000 |
| JP | 2000312446 A | 11/2000 |
| JP | 2001145284 A | 5/2001 |
| JP | 2002180215 A | 6/2002 |
| JP | 2002199679 A | 7/2002 |
| JP | 2006054932 A | 2/2006 |
| JP | 2006271058 A | 10/2006 |
| JP | 2007244026 A | 9/2007 |
| JP | 2007336771 A | 12/2007 |
| JP | 2008099360 A | 4/2008 |
| JP | 2008136320 A | 6/2008 |
| JP | 2009071910 A | 4/2009 |
| JP | 2009278838 A | 11/2009 |
| JP | 2010158130 A | 7/2010 |
| JP | 2010178493 A | 8/2010 |
| JP | 2012518378 A | 8/2012 |
| JP | 2014050218 A | 3/2014 |
| JP | 2015053823 A | 3/2015 |
| KR | 1020130049189 A | 5/2013 |
| WO | WO0067360 A1 | 11/2000 |
| WO | WO03075324 A1 | 9/2003 |
| WO | WO2008009706 A1 | 1/2008 |
| WO | WO2011151138 A2 | 12/2011 |
| WO | WO2012004343 A1 | 1/2012 |

OTHER PUBLICATIONS

Connor et al., Coating Rejuvenation: New Repair Technology for High Pressure Turbine Blades, ASME Turbo Expo 2000: Power for Land, Sea, and Air, vol. 4, Munich Germany, May 8-11, 2000, 7 Pages. (Abstract Only).

Czerwiec et al., Fundamental and Innovations in Plasma Assisted Diffusion of Nitrogen and Carbon in Austenitic Stainless Steels and Related Alloys, Plasma Processes and Polymers, vol. 6, Issue 6-7, Jul. 18, 2009, pp. 401-409.

El-Refaie et al., Application of Bi-State Magnetic Material to an Automotive IPM Starter/Alternator Machine, IEEE Transactions on Energy Conversion, vol. 20, Issue 1, Mar. 2005, pp. 71-79.

El-Refaie et al., Optimal Flux Weakening in Surface PM Machines Using Fractional-Slot Concentrated Windings, IEEE Transactions on Industry Applications, vol. 41, No. 3, May/Jun. 2005, pp. 790-800.

Ghasaei et al., Torque Ripple Reduction by Multi-Layering Technique in an Interior Permanent Magnet Motor Used in Hybrid Electric Vehicle, Power Electronics, Electrical Drives, Automation and Motion (SPEEDAM), 2014 International Symposium on Jun. 18-20, Ischia, pp. 372-377. (Abstract Only).

Hausbrand et al., Corrosion of Zinc-Magnesium Coatings: Mechanism of Paint Delamination, Corrosion Science, vol. 51, Issue 9, Sep. 2009, pp. 2107-2114.

IDC, Why is 02 Paramagnetic while N2 Diamagnetic, 4 Pages. Retrieved Nov. 16, 2020 from Website: http://www.idc-online.com/technical_references/pdfs/chemical_engineering/Why_is_O2_Paramagnetic_while_N2_Diamagnetic.pdf.

Kolehmainen, Machine with A Rotor Structure Supported Only by Buried Magnets, ISEF 2007-XIII International Symposium on Electromagnetic Fields in Mechatronics, Electrical and Electronic Engineering, Prague, Sep. 2007, 6 Pages.

Lavanya et al., Performance Analysis of Three Phase Induction Motor Using Different Magnetic Slot Wedges, Electric Energy (56) References Cited

OTHER PUBLICATIONS

Systems (ICEES), 2014 IEEE 2$^{nd}$ International Conference in Chennai, Jan. 7-9, 2014, pp. 164-167. (Abstract Only).
Lee et al., Photoresist Removal after Plasma Etching of Metal Film using TiW as Antireflective Coating or as a Barrier Metal, ESSDERC 94: 24$^{th}$ European Solid-State Device Research Conference, Edinburgh Scotland, Sep. 11-15, 1994, pp. 295-298.
Marcos et al., Stainless Steel Patterning by Combination of Micro-Patterning and Driven Strain Produced by Plasma Assisted Nitriding, Surface & Coatings Technology, vol. 205, Jan. 20, 2011, pp. S275-S279.
Mita et al., Magnetic Screw Rod Using Dual State 0.6C—13Cr—Fe Bulk Magnetic Material, Journal of Applied Physics, vol. 91, Issue 10, May 15, 2002, 4 Pages.
Mita et al., Study of Internal Permanent Magnet Rotor Made of 0.6C—13Cr—Fe Dual State Magnetic Material, Journal of Applied Physics, vol. 93, No. 10, May 15, 2003, 4 Pages.
Mita et al., a Study of Retainer Ring Made of 13.5Cr—0.6C—Fe Dual State Magnetic Material, Journal of Magnetism and Magnetic Materials, vols. 254-255, Jan. 2003, pp. 272-274.
Oh et al., New Rotor Shape Design of SRM to Reduce the Torque Ripple and Improve the Output Power, Proceedings of the Eighth International Conference on Electrical Machines and Systems, ICEMS 2005, vol. 1, Sep. 27-29, 2005, pp. 652-654. (Abstract Only).
Putatunda et al., Mechanical and Magnetic Properties of a New Austenitic Structural Steel, Materials Science and Engineering: A, vol. 406, Issue 1-2, Oct. 15, 2005, pp. 254-260. https://doi.org/10.1016/j.msea.2005.06.056; (Abstract Only).
Raminosoa et al., Reduced Rare-Earth Flux-Switching Machines for Traction Applications, IEEE Transactions on Industry Applications, vol. 51, Issue 4, Jul./Aug. 2015, pp. 2959-2971. (Abstract Only).
Rawers et al., Nitrogen Concentration in Fe—Cr—Mn Alloys, Journal of Materials Engineering and Performance, ASM International, vol. 2, Oct. 1993, pp. 561-658. (Abstract Only).
Reddy et al., Performance Testing and Analysis of Synchronous Reluctance Motor Utilizing Dual-Phase Magnetic Material, IEEE Transactions on Industry Applications, vol. 54, Issue 3, May-Jun. 2018, pp. 2193-2201. (Abstract Only) doi: 10/1109/TIA.2018.2801264.
Rudnizki et al., Phase-Field Modeling of Austenite Formation from a Ferrite plus Pearlite Microstructure during Annealing of Cold-Rolled Dual-Phase Steel, Metallurgical & Materials Transactions, vol. 42, Issue 8, Aug. 2011, pp. 2516-2525.
Sanada et al., Rotor Structure for Reducing Demagnetization of Magnet in a PMASynRM with Ferrite Permanent Magnet and its Characteristics, IEEE 2011, pp. 4189-4194. (Abstract Only).
Sanada et al., Torque Ripple Improvement for Synchronous Reluctance Motor Using an Asymmetric Flux Barrier Arrangement, IEEE Transactions on Industry Applications, vol. 40, No. 4, Jul./Aug. 2004, pp. 1076-1082.
Shah et al., Eddy Current Loss Minimization in Conducting Sleeves of High-Speed Machine Rotors by Optimal Axial Segmentation and Copper Cladding, Industry Applications Conference 2007, 42snd IAS Annual Meeting Conference Record of the 2007 IEEE, Sep. 2007, pp. 554-551.
Shashank et al., Selective Plasma Nitridation and Contrast Reversed Etching of Silicon, Journal of Vacuum Science & Technology B, vol. 19, No. 5, Sep./Oct. 2001, 5 Pages.
Simmons, Overview: High-Nitrogen Alloying of Stainless Steels, Materials Science and Engineering, vol. 207, Issue 2, Mar. 30, 1996, pp. 159-169.
Tschiptschin, Predicting Microstructure Development During High Temperature Nitriding of Martensitic Stainless Steels Using Thermodynamic Modeling, Materials Research, vol. 5, No. 3, 2002, pp. 257-262.
Tsuchiyama et al., Thermodynamics of Nitrogen Absorption into Solid Solution in Fe—Cr—Mn Ternary Alloys, Materials Science Forum, Trans Tech Publication, vols. 426-432, Aug. 15, 2003, pp. 957-962. (Abstract Only).
Wan et al., Analysis of Magnetism in High Nitrogen Austenitic Stainless Steel and Its Elimination by High Temperature Gas Nitriding, J. Mater Sci Technology, vol. 27, Issue 12, 2011, pp. 1139-1142.
Wang et al., Fabrication and Experimental Analysis of an Axially Laminated Flux-Switching Permanent-Magnet Machine, IEEE Transactions on Industrial Electronics, vol. 64, No. 2, Feb. 2017, pp. 1081-1091. (Abstract Only).
Werner et al., Energy-Efficient Steels for Motor Laminations, Journal of Materials Engineering and Performance, vol. 1, Issue 2, Mar. 1992, pp. 227-234. (Abstract Only).
Weyand, What is the Difference Between Austenitic, Ferritic, and Martensitic Stainless Steel?, All America Threaded Products, Technical, 2015, 1 Page. (Abstract Only). Retrieved from https://www.aatprod.com/hrf_faq/what-is-the-difference-between-austenitic-ferritic-and-martensitic-stainless/.
Williamson et al., Calculation of the Bar Resistance and Leakage Reactance of Cage Rotors with Closed Slots, IEEE Proceedings B—Electric Power Applications, vol. 132, Issue 3, May 1985, pp. 125-132. (Abstract Only) DOI: 10/1049/jp-b.1985.0018.
Wolbank, Evaluation of Lamination Materials in Zero-Speed Sensorless Controlled Induction Machine Drives, TENCON 2001, Proceedings of IEEE Region 10 International Conference on Electrical and Electronic Technology IEEE Explore, vol. 2, Apr. 19-22, 2001, pp. 613-619.
Wolbank et al., Transient Magnetic Modelling of Sensorless Controlled Induction Machines, Magnetics Conference, 2002 Intermag Europe 2002, Digest of Technical Papers, 2002 IEEE International , IEEE Xplore, Amsterdam, The Netherlands, Apr. 28-May 2, 2002. (Abstract Only).
Yadav et al., Slurry Erosive Wear Study of D-Gun Sprayed Coatings on SAE 431, 2013 International Conference on Control, Computing, Communication and Materials (ICCCCM), Allahabad, 2013, 5 Pages. (Abstract Only).
Zeng et al., Prediction of Interstitial Diffusion Activation Energies of Nitrogen, Oxygen, Boron and Carbon in BCC, FCC, and HCP Metals Using Machine Learning, Science Direct, Computational Materials Science, vol. 144, 2018, pp. 232-247.
ZYP Coatings Inc, For Long-Term Oxidation Protection of Metals, ZYP Coatings, Sealmet Flyer, 1 Page. Retrieved on Apr. 10, 2018 from: https://www.zypcoatings.com/wp-content/uploads/Sealmet-zyp01.pdf.

DUAL PHASE MAGNETIC MATERIAL COMPONENT AND METHOD OF ITS FORMATION

FIELD OF TECHNOLOGY

This disclosure relates generally to a component having multiple magnetic and nonmagnetic regions, and a method of forming the same. More particularly, the disclosure relates to a component having multiple magnetic and non-magnetic regions, and formation of the same by nitriding (e.g., solution nitriding).

BACKGROUND

The need for high power density and high efficiency electrical machines (i.e., electric motors and generators) has long been prevalent for a variety of applications, particularly for hybrid and/or electric vehicle traction/propulsion applications. The current trend in hybrid/electric vehicle traction/propulsion motor applications is to increase rotational speeds to increase the machine's power density, and hence reduce its mass and cost. However, it is recognized that when electrical machines are used for traction applications in hybrid/electric vehicles, there is a clear tradeoff between power density, efficiency, and the machine's constant power speed range limited by rotor mechanical strength—and that this tradeoff presents numerous design challenges.

The power output of an electric machine may be increased by increasing the machine size, improving thermal management, increasing rotor speed, or by increasing the magnetic utilization. The magnetic utilization may be increased by using a combination of processing and alloying of a rotor lamination to create a dual phase magnetic material by developing localized areas of high and low permeability. The localized areas of high and low permeability generally reduce flux losses during rotor operation.

A range of ferrous based soft magnetic compositions of the rotor lamination may be austenitized by a combination of processes to form regions of low permeability. This phase transformation at selected regions may be thermally driven in the presence of carbides in the alloy. Upon local heating, the carbides that are present at selected locations dissolve in the matrix and depress the martensite start temperature, thereby aiding the stabilization of austenite regions at room temperature. However, the presence of carbides in a magnetic microstructure is known to increase coercivity and to lower the magnetic saturation, as compared to traditional ferrous-based magnetic steels. A different method of stabilizing the austenite phase at room temperature in intermediate regions of the soft magnet, while starting from a substantially single phase microstructure, is desired to decrease the coercivity.

BRIEF DESCRIPTION

Aspects and advantages will be set forth in part in the following description, or may be obvious from the description, or may be learned through practice of the invention.

A dual phase magnetic component is generally provided, along with methods of its formation. In one embodiment, the dual phase magnetic component includes an intermixed first region and second region formed from a single material, with the first region having a magnetic area and a diffused metal therein, and with the second region having a non-magnetic area. The second region generally has greater than 0.1 weight % of nitrogen.

In one embodiment, the method of forming a dual-phase magnetic component may include forming a metal coating on a portion of the surface of an initial component to form a masked area while leaving an unmasked area thereon. Thereafter, the initial component may be heated to a treatment temperature in the presence of nitrogen gas such that nitrogen diffuses into the unmasked area of the initial component to transform the magnetic ferrous composition to a non-magnetic austenite composition in the unmasked area. Heating may also diffuse the metal coating into the masked area of the initial component. Thereafter, the initial component may be cooled from the treatment temperature to form a dual-phase magnetic component having a magnetic region corresponding to the masked area and a non-magnetic region corresponding to the unmasked area.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Different embodiments of the present invention relate to a strengthened dual phase magnetic component, a magnetic composition of the strengthened dual phase magnetic component, and a method of forming the strengthened dual phase magnetic component.

In one embodiment of the invention, a strengthened dual phase magnetic component is disclosed. The term "dual phase magnetic component" as used herein may be a magnetic part of any product, such as for example, a rotor or a stator lamination of a motor that has intermixed first and second regions, where the first region includes a magnetic phase and the second region includes a non-magnetic phase. The "intermixed first and second regions" hereby means that there are many first regions and second regions that are in the vicinity of each other.

Thus, the dual phase magnetic component has dual magnetic regions with one set of regions having a magnetic phase, and another set having a non-magnetic phase. As used herein, the "magnetic phase" is a region where greater than 99 volume % of the region is magnetic, and in general, would act as a magnetic region. Further, a "non-magnetic phase" may be the region where greater than 90 volume % of the region is non-magnetic. The magnetic component as used herein is usually prepared from a single material. As an example, the material may be a composite magnetic member which is formed by providing a ferromagnetic portion and a non-magnetic portion, by nitriding in a controlled atmosphere. When the magnetic component is made using a single material, the negative effects of bonding a ferromagnetic portion and a non-magnetic portion are reduced by ensuring reliability, hermeticity, and the bond strength of the magnetic component.

The "magnetic phase" as used herein is a material in a magnetic state having a relative permeability greater than 1. In one embodiment, the relative permeability of the magnetic phase of the first region of the magnetic component is greater than 100, and a saturation magnetization is greater than 1.5 Tesla. A "non-magnetic phase" as used herein has greater than 90 volume % of the material in which the permeability is approximately 1, and the saturation magnetization is about zero.

Austenite, also known as gamma phase iron (γ-Fe), is a metallic, non-magnetic allotrope of iron or a solid solution of iron. Heating the iron, iron-based metal, or steel to a temperature at which it changes crystal structure from ferrite to austenite is called austenitization. The addition of certain alloying elements, such as manganese, nickel, nitrogen, and carbon, can stabilize the austenitic structure even at room temperature. A dual phase magnetic component may be formed by stabilizing austenite at room temperature, in some regions of the magnetic component, while retaining the strongly ferromagnetic martensite or ferrite phases at some other regions of the magnetic component.

The presence of carbon is known to stabilize the non-magnetic austenite structure. Earlier efforts had been directed at dissolving formed carbides at selected regions of the magnetic component to stabilize non-magnetic phases at those regions of the magnetic component. In one embodiment of the present invention, a non-magnetic region of the magnetic component is formed by stabilizing a low permeability austenite structure by the addition of nitrogen, rather than carbon. Carbides as second phases are known to be undesirable for the magnetic component. Thus, in some embodiments of the present invention, the material forming the magnetic component is substantially free of carbon.

However, in other embodiments of the invention, the composition may contain a relatively small level of carbon, which can sometimes increase the tensile strength of the magnetic region. In these embodiments, the total amount of carbon in the magnetic and non-magnetic regions must be less than about 0.05 weight %.

The second (non-magnetic) region includes nitrogen in a quantity that stabilizes the austenite phase. Like carbon, as nitrogen dissolves into a ferrous alloy, the austenite phase is stabilized. Generally, the presence of carbides, which serve to stabilize the austenite phase upon local heat treatment and dissolution, is established by alloying the initial materials with carbon in the melt. When nitrogen is used to alloy iron, the workability of the alloy is often reduced. In certain embodiments of the present application, nitriding is used after substantial working of the component has been completed.

In one embodiment, a method of preparing a magnetic component is disclosed. Thermodynamic and empirical calculations may be used to predict ferrous alloy compositions that upon the addition of nitrogen at elevated temperatures form the austenite phase. A magnetic component using the designed ferrous alloy composition may be formed by using the traditional methods. In one embodiment, the formed magnetic component is subjected to selective nitriding of the near-final component, without the need to substantially alter the shape and size of the formed magnetic component after nitriding. As used herein the term "selective nitriding" is the nitriding of some (required) regions of the magnetic component, without substantially altering the ferromagnetic nature of the nearby regions. The ferromagnetic nature of the nearby regions may be considered to be "substantially altered", if the average saturation magnetization of those regions is reduced by more than 5 percent.

In one embodiment, the selective nitriding of the magnetic component may be attained by using a metal coating that discourages nitrogen diffusion into the magnetic component may be used as the "nitrogen stop-off" material at some regions.

Nitriding may be carried out through a solid, liquid, gaseous, or plasma route. In one embodiment of the present invention, elevated temperature gas nitriding is used as the preferred method to introduce nitrogen to the part. The elevated temperatures in this technique allow for fast diffusion of nitrogen, providing a quick processing route. Alternately, plasma nitriding may be used for the nitrogen diffusion. In order to avoid nitrogen diffusion in those areas which are intended to stay ferritic (and thus magnetic), in one embodiment, a metal coating is applied to locations where nitrogen diffusion is not desirable. Thus, in this embodiment, the pre-selected regions that correspond to the regions that are supposed to remain magnetic are masked, using the metal coating as a nitrogen stop-off material (i.e., inhibiting and/or substantially stopping the nitrogen from entering into the masked area).

Figure 1:
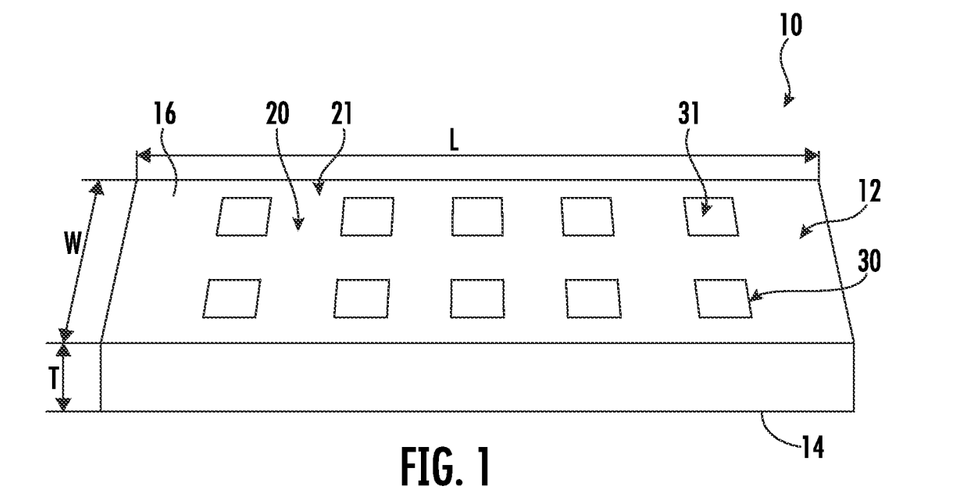
FIG. 1 illustrates a masked component form forming a dual phase magnetic component, in accordance with one embodiment of the invention.

The magnetic component that is subjected to the selective nitriding and metal coating diffusion into substrate to form the strengthened dual-phase magnetic component may be exemplified in FIG. 1. The initial component 10 is formed of a ferromagnetic material, in the size and shape required for the final application of the resulting component. The initial component 10 is, in one embodiment, formed of a composition that has a very reduced concentration of carbon (e.g., a concentration of carbon that is less than 0.05 weight %, such as being substantially free of carbon), and may be of any shape and size. For ease of understanding herein, the initial component 10 is depicted as having a rectangular shape with the top surface 12 and the bottom surface 14 in FIGS. 1 and 2, although it is to be understood that the shape of the initial component 10 may be as desired for the component's application. The initial component 10 has a certain length (l), width (w), and thickness (t).

Figure 3:
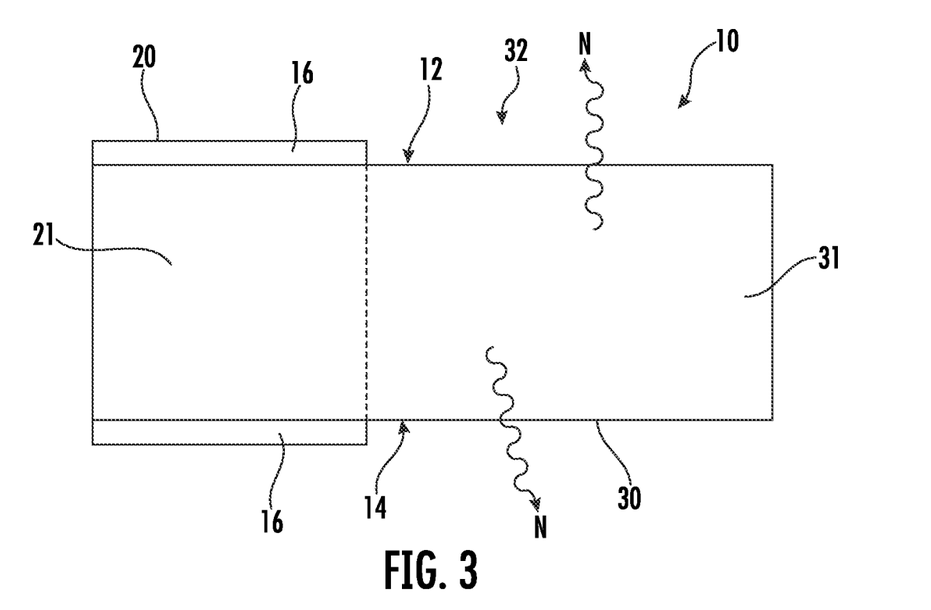
FIG. 3 illustrates a masked component form forming a dual phase magnetic component, in accordance with another embodiment of the invention.

As more particularly shown in FIG. 3, a metal coating 16 is applied on a portion of the surfaces 12, 14 to define a first region 20 corresponding to a masked area 21 and a second region 30 corresponding to an unmasked, exposed area 31.

The magnetic component 10 has a certain length (l), width (w), and thickness (t). The magnetic component 10 includes two marked regions, a first region 20 and a second region 30. The regions are situated so that the first region 20 (corresponding to an underlying masked area 21) has a metal coating 16 on its surface portion of the component, and second region 30 (corresponding to an unmasked area 31) that has an unmasked surface (i.e., substantially free from any metal coating thereon). The first region 20 is designed to be the magnetic region, and is masked, using the metal coating 16 in the component 10. The second region 30 is not masked and hence allows the nitrogen to diffuse through the component 10, making the regions non-magnetic. One skilled in the art would understand that depending on the shape and size of the required magnetic and non-magnetic regions, the masks may be designed of different shapes and at different surfaces.

Nitrogen may be diffused into the component 10 through gas nitriding in a nitrogen-rich atmosphere at a treatment pressure and treatment temperature sufficient for diffusing nitrogen into the component 10 in the second regions 30. Generally, the diffusion of nitrogen is expected to increase with a higher heat-treatment temperature, and an increased equilibrium surface concentration of nitrogen. The increased pressure of the gases surrounding the magnetic component 10 often leads to an increased surface concentration of nitrogen. Therefore, at a given condition in a pure nitrogen atmosphere, a higher than atmospheric pressure and a higher temperature will generally provide a faster nitriding process. For example, a treatment pressure of greater than 1 atmosphere and a treatment temperature of 900° C. or greater is used for nitriding and metal diffusion (e.g., 900° C. to 1400° C.), such as a treatment temperature greater than 1000° C. (e.g., 1000° C. to 1250° C.). In particular embodiments, the treatment temperature may be greater than the melting point of the metal coating (e.g., greater than the melting point of the metal coating to 140% of the melting point of the metal coating, such as greater than the melting point of the metal coating to 130% of the melting point of the metal coating). For example, when the metal coating is made of pure copper (having a melting point of 1085° C.), then the treatment temperature may be greater than 1085° C. (e.g., greater than 1085° C. to 1410° C.).

In one embodiment, a nitrogen-rich atmosphere is used. For example, the nitrogen-rich atmosphere may include 90% nitrogen by volume or greater (e.g., 95% nitrogen by volume or greater). In one embodiment, nitriding is conducted in a substantially pure nitrogen atmosphere. The substantially pure nitrogen atmosphere may be created by filling nitrogen in a furnace cavity after evacuating the air from the furnace cavity, then purging with nitrogen or continuously flowing nitrogen into the atmosphere chamber during processing.

The metal coating 16 may be applied onto the surfaces 12, 14 of the component 10 depending on the desired pattern of metal diffusion (without nitrogen diffusion) verses nitrogen diffusion for the component 10. In one embodiment, all surfaces of the component 10 are defined by either the first region 20 or the second region 30 such that the entire surface of the component 10 is either a metal diffused region (i.e., a magnetic region) or nitrogen diffused region (i.e., a non-magnetic phase). Generally, the nitrogen diffused region is substantially free of any added metal (from metal diffusion) other than the metals initially present in the initial alloy itself since the metal coating is absent on the surface forming the non-magnetic region.

The metal coating 16 may be formed by any suitable method to a coating thickness sufficient to inhibit nitriding therethrough as well as sufficient to increase the strength properties of the component 10 through its diffusion. However, if the metal coating 16 is too thick, then too much of the diffused metal could change the magnetic properties of the underlying component 10. Without wishing to be bound by any particular theory, it is believed that higher amounts of the diffused metal (particularly copper) increases strength of the component 10, but that too much of the diffused metal could alter the magnetic saturation of the component 10. In particular embodiments, the metal coating 16 is formed to a coating thickness of 0.1 μm to 25 μm in the masked area, such as a coating thickness of 0.5 μm to 10 μm in the masked area (e.g., 1 μm to 5 μm).

The metal coating 16 may be formed from a metal or metal alloy that is suitable for inhibiting nitriding therethrough and suitable for diffusion into the ferrite composition of the component 10 to provide either solid solution or precipitation strengthening. Without wishing to be bound by any particular theory, it is believed that metal having slow nitrogen diffusion rates are suitable for maskants. Without wishing to be bound by any particular theory, it is believed that the diffused metal (e.g., copper) is incorporated as solid solution in the ferrite matrix or formation of precipitate dispersion in the ferrite matrix, which increases the strength of the component 10. Particularly suitable metals for the metal coating 16 include those metals that serve to form solid solution or precipitates into host metal compositions, as in a ferrite composition.

In particular embodiments, the metal coating 16 may include copper, nickel, tin, chromium, silver, platinum, gold, boron, magnesium, thorium, zirconium, hafnium, niobium, tantalum, molybdenum, tungsten, rhenium, vanadium, or alloys thereof. For example, the metal coating 16 may be a copper-based composition (i.e., 50% by weight or greater copper), a nickel-based composition (i.e., 50% by weight or greater nickel), a tin-based composition (i.e., 50% by weight or greater tin), a chromium-based composition (i.e., 50% by weight or greater chromium), a silver-based composition (i.e., 50% by weight or greater silver), a platinum-based composition (i.e., 50% by weight or greater platinum), a gold-based composition (i.e., 50% by weight or greater gold), a boron-based composition (i.e., 50% by weight or greater boron), a magnesium-based composition (i.e., 50% by weight or greater magnesium), a thorium-based composition (i.e., 50% by weight or greater thorium), a zirconium-based composition (i.e., 50% by weight or greater zirconium), a hafnium-based composition (i.e., 50% by weight or greater hafnium), a niobium-based composition (i.e., 50% by weight or greater niobium), a tantalum-based composition (i.e., 50% by weight or greater tantalum), a molybdenum-based composition (i.e., 50% by weight or greater molybdenum), a tungsten-based composition (i.e., 50% by weight or greater tungsten), a rhenium-based composition (i.e., 50% by weight or greater rhenium), or a vanadium-based composition (i.e., 50% by weight or greater vanadium). In one particular embodiment, the metal coating 16 may have a copper-based composition that is 50% by weight or greater copper (e.g., 75% by weight to 100% by weight copper).

Figure 2:
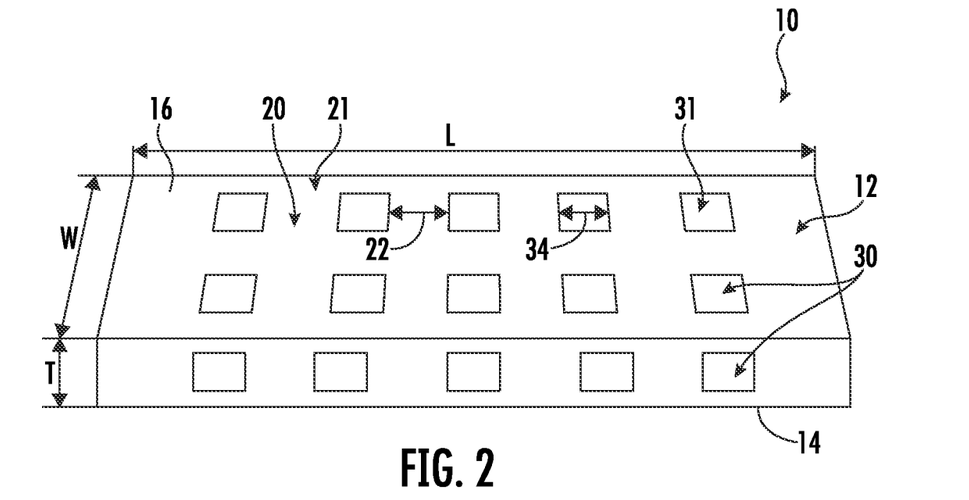
FIG. 2 illustrates a masked component form forming a dual phase magnetic component, in accordance with another embodiment of the invention.

In FIG. 1, the metal coating 16 is applied at the surfaces 12, 14 corresponding to the first region 20 and also at the surfaces covering the thickness of the component 10. Thus, in FIG. 1, nitriding would occur only through the second regions 30 on the top and bottom surfaces 12, and 14 to form the unmasked area 31, and not through the thickness of the component. In FIG. 2, the surfaces through the thickness of the component 10 further include the masked and unmasked areas and hence, the nitrogen diffusion occurs from the top, bottom, and side surfaces in a controlled way.

When the magnetic component is subjected to gas nitriding, the nitrogen diffuses into the component 10, through all unmasked surfaces of the component 10, including the top surface 12, bottom surface 14, and all of the unmasked side surfaces of the component. The nitrogen during nitriding is diffused from the surfaces into the interior portions of the component 10 in the unmasked areas 30. This diffused nitrogen, in conjunction with the composition of the magnetic component, changes the local phase stability in those regions, and converts those regions into non-magnetic austenite. Even though the nitrogen diffuses through the surface, the nitriding parameters allow the nitrogen to diffuse further into the length, width, and thickness of the magnetic component, through all the surfaces of the magnetic component 10, while the masked areas 30 prevent substantial nitrogen diffusion through those regions.

The nitrogen may be diffusing into the interior of the component 10 through the non-masked surface regions, but depending on the pressure and temperature, and certain other parameters, the diffused nitrogen may also slightly undercut the surface masked regions 20, thereby diffusing into some of the interior masked regions 21. Hence, the strict boundaries of the magnetic and non-magnetic regions in the surface portion may be more diffuse in the interior portions. As a result, the percentage of non-magnetic regions in the interior portion may be greater than the percentage of the non-magnetic regions in the surface portion. Thus, in one embodiment, the volume % of the second region in the interior portion is equal to or greater than the volume % of the second region in the surface portion. Thus, if a hypothetical line starting from the surface of a second, nonmagnetic, region is drawn through the interior portion in a direction perpendicular to the surface portion, it is highly likely that the perpendicular line encounters substantially 100% of the second region. However, the same may not always be true for a line that is drawn in the same manner, starting from the surface of a first, magnetic region. In one embodiment, an "undercut" of the non-magnetic phase is less than 200 micrometers.

Through empirical and thermodynamic calculations, the parameters of nitriding may be adjusted, and the nitrogen diffusion at different directions may be predicted for certain regions of the magnetic component 10, and accordingly, the mask size and shape may be altered so that the end product obtained is approximately the desired outcome of the nitriding process.

The under-cutting of the non-magnetic phase may be less in the thinner magnetic components. In thinner components, the majority of the nitrogen diffuses through the top and bottom surfaces 12, and 14 respectively (FIG. 2), and the amount of undercut may be reduced. Additionally, less time is required to achieve through-thickness nitrogen penetration, thus reducing the amount of time in which additional nitrogen diffuses below the mask, creating the undercuts. In one embodiment, the thickness of the component 10 is in a range from 0.1 mm to 5 mm. The desired pattern of the magnetic and non-magnetic regions of this component may be obtained by diffusing the nitrogen through the selectively masked top surface 12 and bottom surface 14, keeping the side surfaces of the thickness t completely masked.

Width 22 (FIG. 2) of the mask of the masked area 20 is the dimension between unmasked areas 30, and may be designed as per the requirement of the magnetic component 10. In one embodiment, a width 34 of each of the second regions 30 in the surface is greater than 0.5 mm. In a further embodiment, a width of each of the second regions 30 in a plane perpendicular to the thickness t is greater than 0.5 mm. (As previously explained, the dimension "w" in FIG. 2 represents the overall width of the magnetic component 10.)

Nitriding of the magnetic component at designed conditions allows the introduction of a tailored amount of nitrogen to be diffused interstitially into the magnetic component. In one embodiment, the second (unmasked) region 30 includes greater than 0.4% of nitrogen. The intermixing and the concentration of nitrogen is not only limited to the unmasked areas of the surface but is present in both the surface portion and the interior portion of the magnetic component 10. The concentration of nitrogen in the surface portion and the interior portion need not be uniform.

Figure 4:
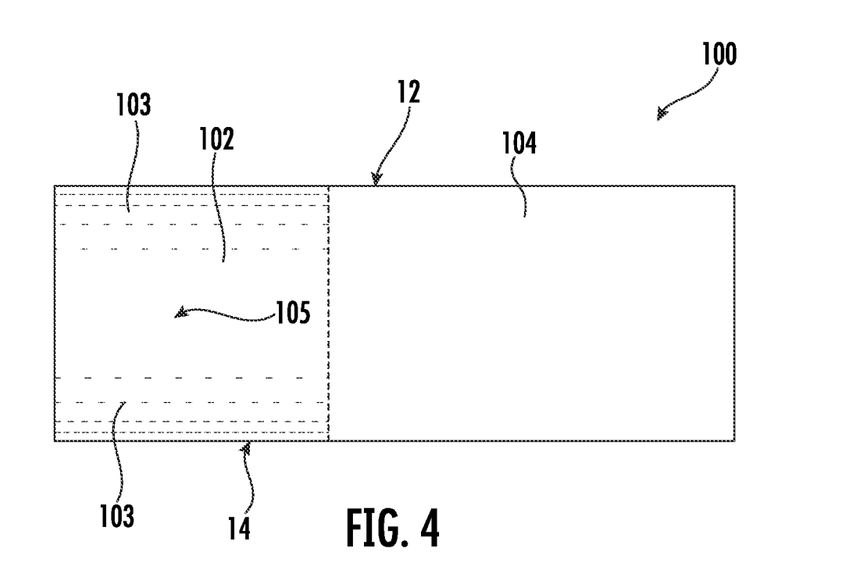
FIG. 4 illustrates a dual phase magnetic component formed after removing a coating, such as shown in FIG. 3.

FIG. 4 shows a dual-phase magnetic component 100 after nitriding and diffusing the metal coating therein. The dual-phase magnetic component 100 includes magnetic areas 102 (corresponding to masked areas 21 of FIG. 3) and nonmagnetic areas 104 (corresponding to unmasked areas 31 of FIG. 3). In particular embodiments, the magnetic areas 102 include a ferrous alloy composition having a nitrogen concentration that is 0.1% by weight or less (e.g., 0.05 wt. % of less) and a diffused metal 103 therein. The diffused metal 103 within the magnetic area 103 (corresponding to masked areas 21 of FIG. 3) may form a substantially uniform composition within the magnetic area 103 or a compositional gradient through the thickness of the within the magnetic area 103. For example, in particular embodiments, a compositional gradient within the magnetic area 103 such that the diffused metal has a surface concentration on the magnetic area 103 (corresponding to the first region 20 and masked area 21 of FIG. 3) that is greater than an interior concentration (e.g., at a center point 105 within the magnetic area 103) within the magnetic area 103 (corresponding to the first region 20 and masked area 21 of FIG. 3). Conversely, the nonmagnetic area 104 of the dual-phase magnetic component 100 may has a nitrogen concentration that is 0.1% by weight or greater, such as 0.4% by weight or greater.

The metal coating 16 diffuses into the masked areas 21 at the treatment temperature during nitriding or at a diffusion temperature (that is greater than the treatment temperature) following nitriding, to form a diffused area 103. In certain embodiments, the diffused area 103 may have a depth within the component 100 from the surface 12,14 that is greater than the thickness of the original metal coating.

Similar to the nitriding, the diffusion of the metal coating 16 into the interior of the masked areas 21 may also slightly undercut the surface unmasked regions 30, thereby diffusing into some of the interior unmasked regions 31. Hence, the strict boundaries of the metal diffusion area in the surface portion may be more diffuse in the interior portions. However, the masked area 21 corresponding to the first region 20 has a greater metal concentration of the diffused metal than the unmasked area 31 corresponding to the second region 30. For example, the masked area 21 corresponding to the first region 20 may have a diffused metal concentration that is 10 times greater than the diffused metal concentration the unmasked area 31 corresponding to the second region 30.

In particular embodiments, the diffusion of the metal coating 16 into the masked area 21 removes the need for a mask removal process (e.g., mechanical or chemical etching) on the surface of the component 10.

Depending on the applications, the desired magnetic region and the non-magnetic region shapes and ratios may vary, and the diffusion of nitrogen may be designed to satisfy these requirements. Accordingly, in one embodiment, a volume percent of the first region in the surface and interior portions is equal to or greater than the volume percent of the second region in the surface and interior portions. In one embodiment, at least one of the first and second regions has an interconnected geometry. The "interconnected geometry" as used herein implies that a region is connected all through the component and is hence not isolated completely from the similar regions, being surrounded by the other regions completely.

Figure 5:
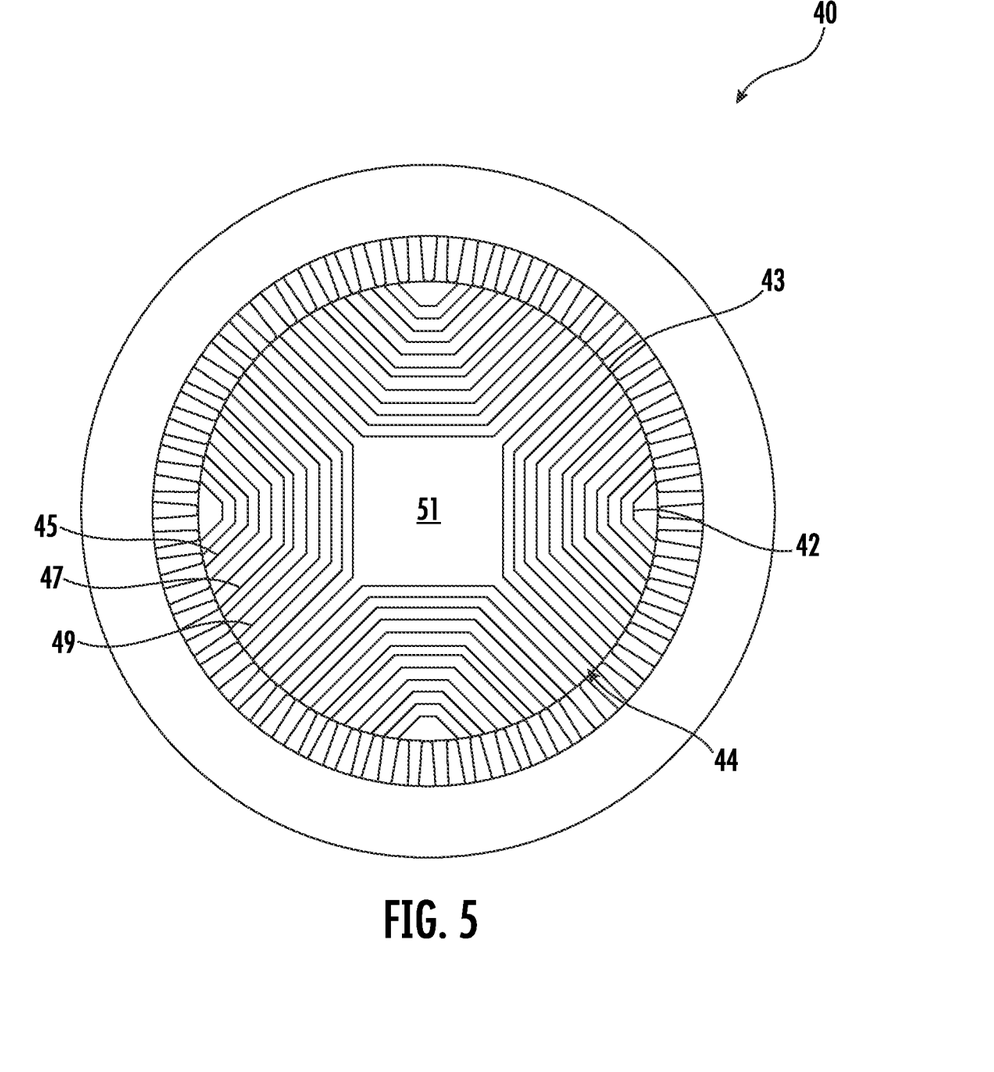
FIG. 5 illustrates an exemplary topology of a dual phase magnetic component, that may be obtained by using the methods described herein, in accordance with one embodiment of the invention.

Different topologies may be presented, having dual phase magnetic materials, by using this technology. FIG. 5 of the present application shows an example of a topology that could benefit from the dual-phase materials. The component 40 can represent a portion of the reluctance machine, including a magnetic region 42 and a non-magnetic region 44, collectively referred to as "laminated segments" below. The selectively shaped rotor 43 of the component 40 is configured as a four-pole machine. Each pole can comprise a plurality of the axially extending, radially positioned ("stacked") laminated segments 45, 47, 49, and the like, which extend from each pole, terminating at a central rotor shaft 51. As described in the Shah patent, the number of poles, and the number of laminations, can vary greatly, depending on the particular design of the reluctance machine.

With continued reference to FIG. 5, the laminated segments effectively guide the magnetic flux into and out of the rotor 43. The magnetic regions 42 constrain the path of the magnetic flux, while the nonmagnetic regions 44 ensure a relatively high density of magnetic flux lines coming out of the surface of the rotor and going into an air gap between the rotor and the stator. In manufacturing these types of reluctance machines according to conventional techniques, magnetic and nonmagnetic laminations usually had to be assembled by various mechanical/metalworking steps, e.g., cutting and welding. The present inventors discovered that many of the desirable techniques could be obtained much more efficiently by the masking and nitriding process described herein.

EXAMPLE

A copper coating was applied via electroplating to a thickness of less than 1 mil onto portions of a magnetic ferrous substrate. Another portion of the magnetic ferrous substrate was left uncoated (i.e., with an exposed surface of the magnetic ferrous substrate).

The selectively coated substrate was then nitrided under an atmosphere of nitrogen gas at a nitriding temperature of 1150° C. for a period of 30 minutes. The ramp rate for this substrate was 10° C. per minute up to the nitriding temperature. Then, the nitride substrate was nitrogen quenched for fast cooling. In this example, the substrate was moved from a hot zone to a cold zone and nitrogen gas quenched by increasing nitrogen gas flow (e.g., 25 cubic foot per hour or higher). Other nitrogen quenching methods may be used (e.g., forced nitrogen gas cooling by increasing nitrogen gas flow in the treatment temperature with the heat source off/removed).

The nitriding temperature was higher than the melting point of copper (about 1,085° C.). Without wishing to be bound by any particular theory, it is believed that the copper coating melted and alloyed with the substrate at the nitriding temperature. Then, the fast cool from the nitriding temperature caused fine Cu precipitates to form within the substrate.

After nitriding, the copper coated region remained magnetic, suggesting that copper effectively blocks nitrogen diffusion into substrate. Additionally, it was apparent that the copper coating diffused into the ferrous substrate by the color change of the exterior surface of the substrate.

The measured saturation magnetization of the Cu diffused region was 14.9 kG, which was close to 15.3 kG of the initial substrate. As such, there was little or no debit on the magnetic properties of the substrate by the copper diffusion therein. Additionally, it was shown that the hardness increased from 2 HRC to 25 HRC, which also confirmed the Cu precipitate strengthening.

The unmasked regions became non-magnetic, showing that nitriding occurred into the unmasked areas.

Further aspects of the invention are provided by the subject matter of the following clauses:

1. A dual phase magnetic component, comprising: an intermixed first region and second region formed from a single material, wherein the first region comprises a magnetic area and has a diffused metal therein, and wherein the second region comprises a non-magnetic area, wherein the second region comprises greater than 0.1 weight % of nitrogen.

2. The component of any preceding clause, wherein the diffused metal comprises copper, nickel, tin, boron, magnesium, thorium, zirconium, hafnium, niobium, tantalum, molybdenum, tungsten, rhenium, vanadium, or an alloy thereof.

3. The component of any preceding clause, wherein the diffused metal comprises a copper-based metal, a nickel-based metal, or a tin-based metal.

4. The component of any preceding clause, wherein the diffused metal comprises at least 50% by weight copper.

5. The component of any preceding clause, that has a strength greater in the first region than an otherwise identical component but for the diffused metal coating therein.

6. The component of any preceding clause, wherein the diffused metal forms a compositional gradient within the first region such that the diffused metal has a surface concentration on the first region that is greater than an interior concentration within the first region.

7. The component of any preceding clause, wherein the second region comprises greater than 0.4 weight % of nitrogen.

8. The component of any preceding clause, wherein the first region has a nitrogen concentration that is less than 0.1 weight %.

9. The component of any preceding clause, wherein a concentration of carbon in both the first region and the second region is less than 0.05 weight %.

10. A method of forming a dual-phase magnetic component from an initial component comprising a magnetic ferrous composition and having a surface, the method comprising: forming a metal coating on a portion of the surface of the initial component to form a masked area while leaving an unmasked area thereon; thereafter, heating the initial component to a treatment temperature in the presence of nitrogen gas such that nitrogen diffuses into the unmasked area of the initial component to transform the magnetic ferrous composition to a non-magnetic austenite composition in the unmasked area, wherein heating also diffuses the metal coating into the masked area of the initial component; and thereafter, cooling the initial component from the treatment temperature to form a dual-phase magnetic component having a magnetic region corresponding to the masked area and a non-magnetic region corresponding to the unmasked area.

11. The method of any preceding clause, wherein the diffused metal coating increases the strength of the initial component in the magnetic region.

12. The method of any preceding clause, wherein the metal coating comprises copper, nickel, tin, boron, magnesium, thorium, zirconium, hafnium, niobium, tantalum, molybdenum, tungsten, rhenium, vanadium, or an alloy thereof.

13. The method of any preceding clause, wherein the metal coating comprises a copper-based composition, a nickel-based composition, or a tin-based composition.

14. The method of any preceding clause, wherein the metal coating comprises 75% by weight copper or greater.

15. The method of any preceding clause, wherein the non-magnetic region comprises greater than 0.4 weight % of nitrogen, wherein the metal coating inhibits diffusion of nitrogen into the masked area such that the magnetic region has a nitrogen concentration that is less than 0.1 weight %.

16. The method of any preceding clause, wherein the metal coating is formed to a thickness of 0.1 μm to 25 μm in the masked area.

17. The method of any preceding clause, wherein the treatment temperature is 900° C. or greater.

18. The method of any preceding clause, wherein the metal coating has a melting point, and wherein the treatment temperature is greater than the melting point of the metal coating to 130% of the melting point of the metal coating.

19. The method of any preceding clause, wherein heating the initial component to the treatment temperature in the presence of nitrogen gas comprises: forming a nitrogen-rich atmosphere around the initial component, wherein the nitrogen-rich atmosphere includes 90% nitrogen by volume or greater, wherein the nitrogen-rich atmosphere has a treatment pressure that is 0.5 atmosphere or greater.

20. The method of any preceding clause, wherein the diffused metal forms a compositional gradient within the magnetic region such that the diffused metal has a surface concentration on a surface of the magnetic region that is greater than an interior concentration within the magnetic region.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dual phase magnetic component, comprising:
   an intermixed first region and second region formed from a single material,
   wherein the first region comprises a magnetic area and has a diffused metal therein, wherein the diffused metal forms a compositional gradient within the first region such that the diffused metal has a surface concentration on the first region that is greater than an interior concentration within the first region, and
   wherein the second region comprises a non-magnetic area, wherein the second region comprises greater than 0.1 weight % of nitrogen.

2. The dual phase magnetic component of claim 1, wherein the diffused metal comprises copper, nickel, tin, boron, magnesium, thorium, zirconium, hafnium, niobium, tantalum, molybdenum, tungsten, rhenium, vanadium, or an alloy thereof.

3. The dual phase magnetic component of claim 1, wherein the diffused metal comprises a copper-based composition, a nickel-based composition, or a tin-based composition.

4. The dual phase magnetic component of claim 1, wherein the diffused metal comprises at least 50% by weight copper.

5. The dual phase magnetic component of claim 1, that has a strength greater in the first region than an otherwise identical component but for the diffused metal therein.

6. The dual phase magnetic component of claim 1, wherein the second region comprises greater than 0.4 weight % of nitrogen.

7. The dual phase magnetic component of claim 1, wherein the first region has a nitrogen concentration that is less than 0.1 weight %.

8. The dual phase magnetic component of claim 1, wherein a concentration of carbon in both the first region and the second region is less than 0.05 weight %.

9. A dual phase magnetic component, comprising:
   an intermixed first region and second region formed from a single material;
   wherein the first region comprises a magnetic area and has a diffused metal therein, wherein the diffused metal comprises at least 50% by weight copper; and
   wherein the second region comprises a non-magnetic area, wherein the second region comprises greater than 0.1 weight % of nitrogen.

10. The dual phase magnetic component of claim 9, wherein the diffused metal comprises copper, nickel, tin, boron, magnesium, thorium, zirconium, hafnium, niobium, tantalum, molybdenum, tungsten, rhenium, vanadium, or an alloy thereof.

11. The dual phase magnetic component of claim 9, wherein the diffused metal comprises a copper-based metal, a nickel-based metal, or a tin-based metal.

* * * * *